C. S. SWEET, Jr.
TICKET.
APPLICATION FILED JUNE 21, 1916.

1,234,232.

Patented July 24, 1917.

UNITED STATES PATENT OFFICE.

CHARLES SINGLETON SWEET, JR., OF CHICAGO, ILLINOIS.

TICKET.

1,234,232.  Specification of Letters Patent.  Patented July 24, 1917.

Application filed June 21, 1916. Serial No. 104,840.

*To all whom it may concern:*

Be it known that I, CHARLES S. SWEET, Jr., a citizen of the United States, residing at Chicago, in the county of Cook and State of Illinois, have invented certain new and useful Improvements in Tickets, of which the following is a specification.

The invention has for its object the provision in a round trip pass, paid ticket, or the like, of certain features of construction and arrangement facilitating the making out of such tickets and the safe-guarding the same against fraudulent alteration. In order that the invention and the manner of its use may be readily understood a preferred embodiment of the same is set forth in the accompanying drawing and in the following detailed description. Obviously the invention is susceptible of modified embodiment without departure from the essential features thereof, wherefore the drawing and description are to be understood in an illustrative rather than in an unnecessarily limiting sense. In the drawing—

Figure 1 is a face view of a ticket in the form of a round trip pass embodying the invention; and Fig. 2 is a similar view of the reverse side of the same ticket.

It will be observed that as illustrated the ticket comprises a going coupon 11, a return coupon 12, and a record coupon 13, the latter provided with an extension 14 for binding in book form, each of the coupons being separable from each other by the provision of weakened lines 15, 16, and 17, the latter being omitted if the record coupons are to be retained in the book as stubs.

It will be noted that the matter upon the record coupon and the going coupon are substantially the same both as to the printed matter and in spaces provided for writing in the name of the person to whom issued, the accommodations granted, the point of departure, the point of destination, the account for which the ticket is issued, the road by which it reads, and the date of issue and expiration. The record coupon, however, contains in addition printed matter indicating that the ticket is issued from the starting point to the destination and return, and also contains blank spaces for the insertion of the names of the persons by whom the request is made and by whom approved. Obviously the matter on this record coupon as also upon the going coupon may be changed to suit the circumstances of the case.

It will be noted that the face of the ticket shown in Fig. 1 contains the obverse of the record coupon and of the going coupon and the reverse of the return coupon, whereas in Fig. 2, showing the opposite side of the ticket, the obverse of the return coupon appears together with the reverse of the going coupon and the record coupon is blank.

It will also be observed that on the obverse of the return coupon the positions of the words "from" and "to" are changed in such manner that the point of departure and of destination, while occupying a position corresponding to the same spaces on the record coupon and the going coupon are yet associated with different reading matter so as to apply on the return trip.

If, in making out the tickets, the return and going coupons be folded on the line 16 over above the record coupon 13 and the going coupon be then folded back upon the line 15, above the return coupon 12 and a carbon sheet be inserted between the superposed record and return coupons and also another sheet between the return coupon and going coupon, all of the spaces to be filled in by the person making out the tickets will register, so that in the one writing of the same with a stylus or typewriter each of the three coupons will be properly and simultaneously filled out.

A ticket constructed and arranged as herein disclosed obviates the writing of each coupon separately, prevents danger of error or confusion through the usual practice of making the going coupon read "Good only in the opposite direction to that indicated on the attached coupon", or similar words. It also acts as a safe-guard against fraudulent alteration of the coupons or either of them.

I claim:

1. A foldable ticket comprising a plurality of sections and a line of fold, the line dividing the sections and said sections constituting severally a going coupon and a return coupon, each coupon having thereon appropriate printed matter associated with blank spaces and indicating the points of departure and destination, the departure space on the going coupon registering when folded with the destination space on the return coupon, and the destination space of the going coupon registering with the departure space of the return coupon, whereby with the aid of a carbon sheet both coupons may be made out simultaneously.

2. A foldable ticket comprising a plurality of sections and a plurality of lines of fold, the lines dividing the sections, and said sections constituting severally a record coupon, a going coupon and a return coupon, each coupon having thereon appropriate printed matter associated with blank spaces and indicating the point of departure and destination, the departure spaces on the record and going coupons registering when folded each with the other and with the destination space on the return coupon, and the destination spaces of the record and going coupon registering each with the other and with the departure space on the return coupon, whereby with the aid of carbon sheets all coupons may be made out simultaneously.

3. A foldable ticket comprising a plurality of sections and a plurality of lines of fold, the lines dividing the sections, and said sections constituting severally a record coupon, a going coupon and a return coupon, each coupon having thereon appropriate printed matter associated with blank spaces and indicating the point of departure and destination, the departure spaces on the record and going coupons registering when folded each with the other and with the destination space on the return coupon, and the destination spaces of the record and going coupon registering each with the other and with the departure space on the return coupon, and other registering printed matter and spaces for indicating the name of the party to whom issued, date of issue, account for which issued, and the like, whereby with the aid of carbon sheets all coupons may be made out simultaneously.

CHARLES SINGLETON SWEET, Jr.

Witnesses:
CHAS. J. DUNHAM,
C. B. HAWKE.

Copies of this patent may be obtained for five cents each, by addressing the "Commissioner of Patents, Washington, D. C."